United States Patent [19]

Phillips

[11] Patent Number: 4,686,445
[45] Date of Patent: Aug. 11, 1987

[54] VOLTAGE REGULATOR FOR LAWN MOWER ENGINE BATTERY CHARGER

[75] Inventor: Charles E. Phillips, Ft. Mill, S.C.

[73] Assignee: Textron Inc., Providence, R.I.

[21] Appl. No.: 884,203

[22] Filed: Jul. 10, 1986

[51] Int. Cl.[4] .......................... H02J 7/10; H02P 9/00
[52] U.S. Cl. ..................................... 320/61; 322/89; 322/94
[58] Field of Search ....................... 322/89, 97, 94, 58; 320/61, 2, DIG. 2, 57, 59

[56] References Cited

U.S. PATENT DOCUMENTS

| | | | |
|---|---|---|---|
| 3,760,259 | 9/1973 | Tharman | 322/89 X |
| 3,991,356 | 11/1976 | Spiteri | 320/2 |
| 4,105,962 | 8/1978 | Scott, Jr. et al. | 320/35 X |
| 4,405,892 | 9/1983 | Staerzl | 322/89 |

OTHER PUBLICATIONS

Archer Semiconductor Reference Guide, 1984, Radio Shack, pp. 80, 81.

Primary Examiner—R. J. Hickey
Attorney, Agent, or Firm—Abraham Ogman

[57] ABSTRACT

A voltage regulator is presented which is useful in controlling the recharging of the battery of a walk-behind lawn mower. The battery is used as an energizing source for cranking the piston engine of the mower. Once the engine is running it drives a small alternator whose rectified output is a low power capacity pulsating DC voltage capable of recharging the battery. To prevent overcharging of the battery, a voltage regulator module is introduced between the alternator output and the input to the battery. The voltage regulator includes a ripple smoothing capacitor shunted across the output of the alternator, a 3-terminal positive voltage regulator packaged in integrated circuit form having a voltage input terminal, a voltage output terminal and an output voltage adjustment terminal. A solid state diode placed in series between the voltage output terminal of the regulator and the positive input terminal of the battery prevents battery discharge through the regulator module when the engine is stopped. The output voltage adjustment terminal is referenced to that voltage with respect to ground which limits the emf across the battery to a value no greater than the fully charged condition.

1 Claim, 3 Drawing Figures

VOLTAGE REGULATOR FOR LAWN MOWER ENGINE BATTERY CHARGER

BACKGROUND OF THE INVENTION

This invention relates to control of the recharging of the battery used to crank a small engine such as is used in a walk-behind lawn mower.

The small gasoline powered piston engine used in walk-behind lawn mowers typically has a power rating in the 3.0 to 4.5 HP range. Most are rope cranked. For those customers desiring a push button starting mode, industry has responded by adding a small DC starting motor to the engine. The starting motor is usually powered by a low capacity 12 volt lead-acid storage battery mounted at an appropriate location on the mower. Cranking by means of the starting motor runs down the battery necessitating the incorporation of a recharging mode. This can be accomplished after the mowing task is completed by coupling a charging unit into a source of 110 volt 60 cps power supplied by the local utility company. Alternatively, a small power generator can be added to the lawn mower engine and the battery recharged during each running thereof, the same as is done with tractors and automobiles.

The engine designers have found a way to incorporate an alternator into the flywheel of the piston engine used in lawn mowing applications. Addition of rectifying diodes in the alternator circuitry produces a pulsating DC output voltage wave train which is useful in charging the lead-acid storage battery. In the prior art systems, the pulsating DC output from the alternator has been coupled directly to the battery without regulation. The result is that the battery tends to be overcharged causing boil-off of electrolyte and shortened life expectancy of the battery.

My invention adds a voltage regulator between the output of the alternator and the storage battery. The voltage regulator prevents overcharging of the battery and greatly improves the useful life thereof.

SUMMARY OF THE INVENTION

According to the present invention, a voltage regulator and associated circuitry is introduced into the battery recharger of a walk-behind lawn mower. The piston engine for which the invention forms a part, includes a DC motor useful for cranking purposes and a lead acid storage battery providing an energizing source for the motor.

Once the piston engine is running and capable of providing mechanical output power, it also drives a small alternator whose rectified output is a pulsating DC voltage. The mean value of this voltage is higher than the voltage needed to pass charging current through the storage battery when it is fully charged. Therefore, I insert a voltage regulator module between the output terminals of the alternator and the battery.

The voltage regulator module accomplishes several functions. Firstly, there is a large capacitor encircuited across the output terminals of the alternator. This capacitor reduces the magnitude of the voltage ripple of the generated power. Second, there is a three terminal solid state positive voltage regulator packaged in a standard transistor case. Included are overload protection circuitry for both thermal and current considerations. Thirdly, the voltage regulator module includes a solid state diode encircuited so as to allow charging of the battery when the piston engine is running but prevents battery discharge through the regulator when the engine is stopped.

A BRIEF DESCRIPTION OF THE DRAWINGS

DESCRIPTION OF THE PREFERRED EMBODIMENT

Figure 1:
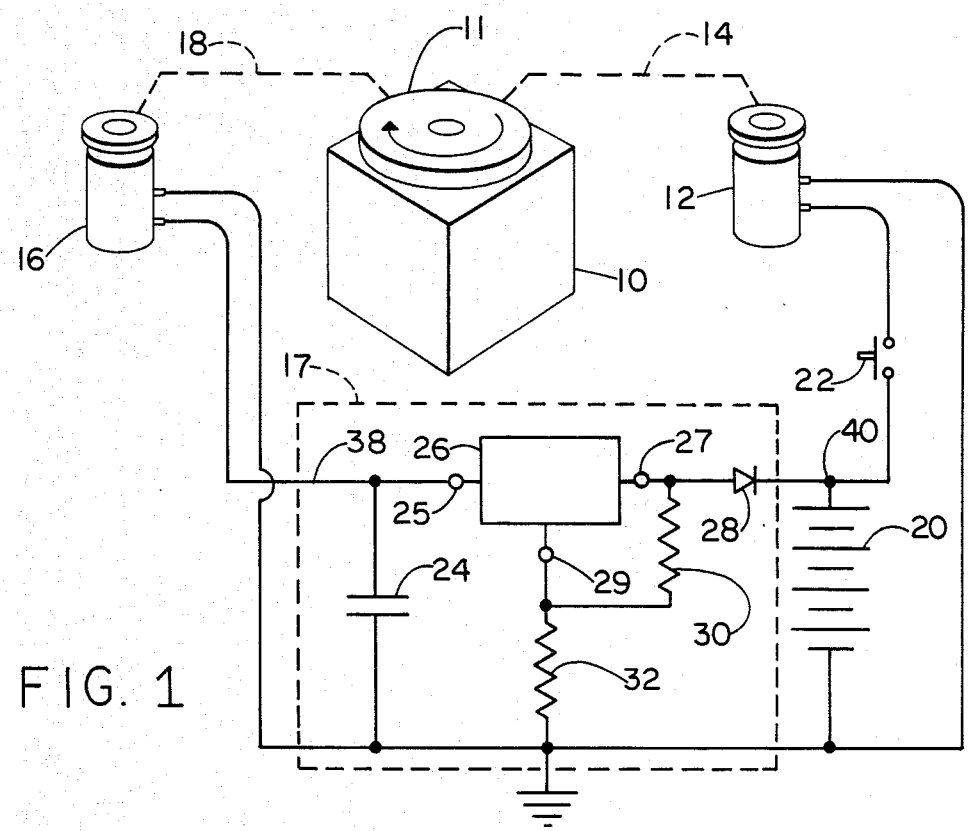
FIG. 1 is a schematic, partially in functional block diagram form of a battery charging system useful in a motor cranked small piston engine.

Referring to FIG. 1, small piston engine 10 is figuratively shown. Engine 10 has a flywheel 11 on its uppermost side which rotates clockwise when the engine is running. A starting motor 12 is used to crank engine 10. Starting motor 12 is mechanically coupled by linkage 14 to engine flywheel 11. Linkage 14 is of conventional design and includes both clutch and gear mechanisms. To start engine 10, an operator depresses push button switch 22 which encircuits battery 20 with starting motor 12 causing the engine cranking action to commence. It is assumed that the operator properly sets the throttle and choke parameters of the engine before initiating engine cranking. Once the engine fires, push button switch 22 released. This stops starting motor 12 causing disengagement of linkage 14 from engine 10 which is left running. In the system reduced to practice piston engine 10 was rated at 3.75 Hp and battery 20 was a small sized lead acid type having 6 cells providing a nominal 12 volt output rating.

When engine 10 is running, electricity is generated by alternator 16 due to its linkage with flywheel 11 via coupler 18. In the system reduced to practice, alternator 16 was integral with engine flywheel 11. However, showing the two as functionally separate but linked is deemed correct for descriptive purposes.

The output of alternator 16 is a pulsating direct current (DC) having a peak value of approximately 16 volts when engine 10 is running at normal working values (2,000–3,000 rpm). The output alternator 16 is encircuited with the input of voltage regulator module 17.

Voltage regulator module 17 comprises a 3-terminal integrated circuit packaged positive voltage regulator 26 having voltage input terminal 25, voltage output terminal 27 and output voltage adjustment terminal 29. Additionally, module 17 includes a ripple smoothing capacitor 24, an output voltage regulating divider network consisting of resistors 30 and 32, and solid state diode 28 which prevents battery drain back through the voltage regulator module 17 when engine 10 is stopped. In the unit first reduced to practice positive voltage regulator 26 was a type LM317T made by National Semiconductor. The LM317T device is available in a TO-220 package, has a rated power dissipation of 15 W and a design load current of 1.5 amp. In the system reduced to practice capacitor 24 was sized at 470 mfd with a 50 volt rating. Diode 28 was a type IN4004.

The values for resistors 30 and 32 have to be calculated using the following formula supplied by National Semiconductor:

$$V(\text{out}) = 1.25 \text{ volt } [1 + (R_{32}/R_{30})]$$

Taking into account that the desired charging voltage at the plus terminal 40 of the battery is 13.75 volts and that there is a 0.7 volt drop across diode during the charging cycle, it can be shown that appropriate values for the resistors are:

$R_{32}$=2400 ohms.
$R_{30}$=226 ohms.

The reason for choosing a 13.75 volt charging voltage has to do with the characteristics of a lead-acid battery cell. Referring to *Mechanical Engineers' Handbook;* T. Baumeister, Editor; Sixth Edition; McGraw-Hill Book Company, Inc. page 15–17 it states:

"The emf of a lead cell when fully charged and idle is 2.05 to 2.10 volts. Discharge lowers the voltage in proportion to the current. When charging at constant current and normal rate, the terminal voltage gradually increases from 2.14 to 2.3 volts, then increases rapidly to between 2.5 and 2.6 volts. This latter interval is known as the gassing period. When this period is reached, the charging rate should be reduced in order to avoid waste of power and unnecessary erosion of the plates." The selected battery for use with the mower has 6 cells. Dividing 13.75 volts by 6 equals 2.292 volts. Thus, using my voltage regulator module 17, implemented as described above, the charging current is reduced to a trickle when each battery cell nears the fully charged terminal voltage state of 2.3 volts.

Figure 2:
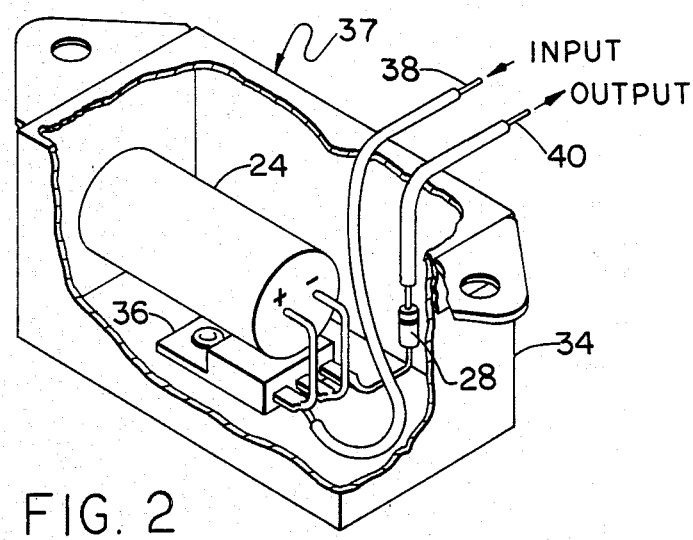
FIG. 2 is a partially cutaway view of the voltage regulator module of the system reduced to practice.

Having obtained good results with the FIG. 1 implementation of my invention, additional research was conducted to determine whether further operating improvements were possible. Voltage regulator module 37 shown in FIGS. 2 and 3 are the result.

In the second voltage regulator module reduced to practice, another type of 3-terminal positive voltage regulator was used. It was discovered that nomenclatured device LM7815 can be used without having to utilize a voltage divider resistive network to adjust the output voltage level of the battery charger. FIG. 3 shows the result of making this change. Using device LM7815, I discovered that output voltage adjustment terminal 29 could be grounded and the voltage output terminal 27 would be set at 14.45 volts. Taking the voltage drop across the diode into account, the charging voltage at the battery terminal will be 13.75 volts.

Figure 3:
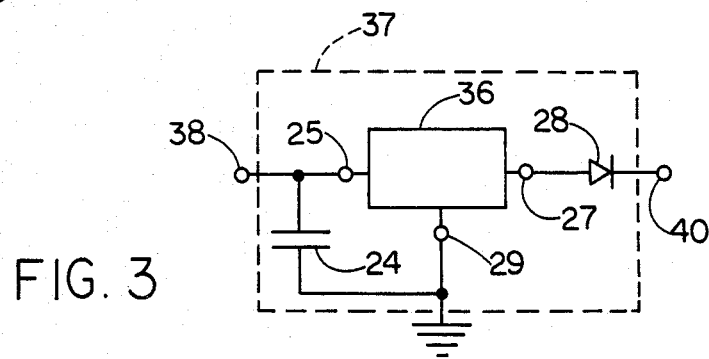
FIG. 3 is a schematic of the electronic assembly within the FIG. 2 module.

It will be understood that module 37 of FIG. 3 is to be substituted for module 17 of the FIG. 1 system with circuit lead 38 being the positive input, circuit lead 40 being the positive output to battery 20 and the ground lead being common to both implementations.

Referring to FIG. 3, capacitor 24 is sized at 470 mfd with a 50 volt rating, diode 28 is a type IN4004 and 3-terminal positive voltage regulator 36 is a type LM7815 available from National Semiconductor. Packaging of these components is shown in FIG. 2. The solid state voltage regulator case is electrically and mechanically secured to the bottom of a small tub-shaped metal casing 34 as by bolt or rivet means. The capacitor and the diode are encircuited by point-to-point hard wiring. After electronic bench testing the metal casing is filled with an epoxy to physically and environmentally protect the assembly. The completed module 37 is then ready for installation in a FIG. 1 type piston engine having a battery powered cranking capability. By electrically and mechanically securing the solid state voltage regulator case to metal casing 34 both a heat sink and readily encircuited negative ground are established.

My invention solves a voltage regulation problem in an unexpected way. Firstly, the known prior art walk-behind lawn mowers having a battery powered cranking capability do not limit the recharging current when the battery becomes fully charged. My invention reduces the charging current flowing into the battery to a trickle when the fully charged voltage status is reached. Secondly, my invention accomplishes the voltage regulation task by utilization of a component intended for use in electronic equipment such as digital data processors. Since the alternator for a small horsepower piston engine cannot divert an appreciable amount of power from the intended work assignment of the engine, I recognize the feasibility of using a solid state voltage regulator module that is capable of controlling less than 40 watts of power.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the attached claims.

I claim:

1. In combination with a lawn mower electrical system of the type wherein a lead-acid storage battery supplies an electrical engine cranking motor with a voltage for placing said engine in a running condition and, when said engine is running, electricity is generated by an alternator coupled to said engine for recharging said battery, the output of said alternator being a pulsating positive voltage having a peak value greater than the terminal value of the storage battery when said storage battery is fully charged, the improvement which comprises:

a ripple smoothing capacitor encircuited to shunt the output of said alternator, a 3-terminal integrated circuit packaged positive voltage regulator having a voltage input terminal, a voltage output terminal and an output voltage adjustment terminal, the voltage input terminal being encircuited to be in continuity with the positive voltage output of said alternator and in series with said battery;

a diode encircuited between the terminal of said battery and the voltage output terminal of said 3-terminal positive voltage regulator, the polarity of said diode being oriented to permit charging current to flow into said battery, but precluding current drain from said battery to said voltage regulator module when said engine is stopped, and reference voltage means applied to said output voltage adjustment terminal for maintaining the charging voltage across the battery terminals at the predetermined value for limiting the charging current to the battery.

* * * * *